United States Patent [19]
Arndt

[11] 3,897,339
[45] July 29, 1975

[54] FILTER ASSEMBLY HAVING A PRECOMPACTED FILTER MEDIUM

[75] Inventor: Edward D. Arndt, Kentfield, Calif.

[73] Assignee: Bohna Engineering & Research, Inc., San Francisco, Calif.

[22] Filed: May 24, 1974

[21] Appl. No.: 472,993

Related U.S. Application Data

[63] Continuation of Ser. No. 320,840, Jan. 3, 1972, abandoned, which is a continuation-in-part of Ser. No. 57,982, July 24, 1970, abandoned.

[52] U.S. Cl. ................. 210/283; 210/284; 210/336
[51] Int. Cl. ............................................ B01d 25/06
[58] Field of Search ........... 210/226, 228, 231, 265, 210/283, 284, 484, 485, 336

[56] References Cited
UNITED STATES PATENTS

| | | | |
|---|---|---|---|
| 353,514 | 11/1886 | Swenson | 210/228 |
| 1,302,812 | 5/1919 | Kuryla | 210/284 |
| 2,453,613 | 11/1948 | Babbitt | 210/228 |

*Primary Examiner*—John Adee
*Assistant Examiner*—Ivars Cintins
*Attorney, Agent, or Firm*—Phillips, Moore, Weissenberger, Lempio & Strabala

[57] ABSTRACT

A filter assembly of a type for providing a large filter area and comprising a filter housing, a particulate filter material and structure for supporting the filter material in filter elements with influent and effluent passages on opposite sides of each of the filter elements, the filter material being precompacted within the filter elements and substantially rigidly confined therein during filter operations. The filter material, preferably sand, is precompacted by at least approximately 10% relative to its normal bulk density. The filter elements, the influent passages and the effluent passages are preferably supported or formed by similar frame members which are vertically arranged in parallel relation within the filter housing to provide a large filter area per unit area or volume while permitting modular construction of filters with varying capacities. Porous sheet material on each filter element contains the filter medium. Spacing structure supported by the frame members forms substantially unimpeded influent and effluent passages while maintaining precompaction of the filter medium within the filter elements.

2 Claims, 9 Drawing Figures

3,897,339

Patented Jul 29 1975 — Sheet 1

FIG_2

FIG_1

INVENTOR.
EDWARD D. ARNDT
BY

ATTORNEYS

FIG_3

FIG_8

FIG_9

INVENTOR.
EDWARD D. ARNDT

BY

ATTORNEYS

FIG_6

FIG_4

FIG_5

INVENTOR
EDWARD D. ARNDT
BY

ATTORNEYS

FIG-7

INVENTOR.
EDWARD D. ARDNT

FILTER ASSEMBLY HAVING A PRECOMPACTED FILTER MEDIUM

This is a continuation of application Ser. No. 320,840, filed Jan. 3, 1972, and now abandoned, which in turn was a continuation-in-part of application Ser. No. 57,982, filed July 24, 1970 and also now abandoned.

BACKGROUND OF THE INVENTION

The present invention relates to filters and more particularly to filter assemblies which are compact and relatively simple to operate. Filter assemblies constructed and tested according to the present invention have been found to be highly effective in that they are capable of producing a "highly polished" effluent in a wide variety of applications.

Typical applications for the filter assembly of the present invention include the treatment of sea water, river water, algal suspensions, chemical slurries, domestic wastewaters, industrial process waters, industrial effluents and other fluids including certain gas products as well as liquids other than water.

The effectiveness of the filter assembly of the present invention within such applications is believed attributable to the use of a precompacted filter material, preferably sand, which is maintained or confined in its precompacted state during the entire filtration cycle, including both filter and backwash operations. Although sand is preferred as a filter material, other particulate materials such as diatomaceous earth, alumina, activated carbon and the like may be similarly employed.

Precompaction of the filter material according to the invention permits the filter material to be arranged in relatively thin panels or elements so that a large filtering surface area is provided per unit of filter volume.

The invention as disclosed in greater detail by the following description of a preferred embodiment, also preferably provides novel support structure for maintaining the filter elements in vertical alignment while providing influent and effluent passages on opposite sides of each filter element.

Precompaction of the filter material causes filtration to occur substantially upon surfaces of the filter elements so that backwashing of the filter assembly is facilitated. In addition, the precompacted filter material provides generally uniform filtering characteristics from initiation of a filtering cycle until backwash of the filter is commenced.

Additional advantages of the filter system include adaptability for accepting wide and rapid variations in flow rates without deterioration of the filtrate quality. Accordingly, "continuous flow" is not required to assure fine filtration. Also, the filter assembly may be operated under constant inlet flow rate conditions so that control is simplified and the system may be inexpensively automated.

Tests of filter assemblies constructed according to the present invention have also evidenced substantial versatility and suitability for use in a wide variety of applications such as those described above. In particular, the filter system has demonstrated a capacity for heavy solids loading and will accept fluids having very large concentrations of suspended solids. The filter system has been found to be capable of removing suspended solids in as small a size range as 0.5 microns and to consistently reduce turbidity to less than 1.0 Jackson Turbidity Units. It is also important to note that the filtration of such small particles have been successful without the addition of coagulating chemicals or precoat materials which minimizes the need for pretreatment and also simplifies the removal of desirable solids from the backwash.

The present filter assembly may possibly be most readily compared with sand filters such as the common "slow" and "rapid" sand filters rather than filter press type systems, for example. The present filter assembly is contemplated as including certain desirable features of these prior art sand filters while having certain other characteristics which are superior to either.

For example, slow sand filters are relatively simple to construct and operate while normally avoiding the need for coagulation additives. However, these filters are normally constructed with a filter bed having a depth of two or more feet and are operated at low flow rates per unit surface area so that large quantities of land are necessary for their installation.

Rapid sand filters on the other hand may be more compact and more flexible in operation than slow sand filters. They are less effective than slow sand filters in reducing turbidity unless the fluid is adequately pretreated, for example by a coagulating agent such as alum or the like. They tend to rapidly plug during filtration of slime-like materials such as an algal suspension.

Accordingly, characteristics of the present filter assembly as discussed above may be seen as comparing very favorably with either of the prior art types of sand filters. In addition, the present filter assembly, although it also employs sand as a preferred filter material, has significantly different structural characteristics as compared to the slow and rapid sand filters. As noted above, slow sand filter beds are usually about three feet in depth while rapid sand filters employ sand beds having a minimum depth of approximately 24 inches while normally having a 30 by 36 inch depth.

The present filter assembly on the other hand, is preferably constructed with relatively thin filter elements which may be vertically arranged in spaced apart relation to provide a very large filter surface area per unit of filter volume. Test data illustrates effectiveness of smaller filter element thicknesses, for example, of one-half inch or less. Tests conducted with filter elements having a thickness of 0.375 inches indicated that even thinner elements would be effective upon the development of practical fabrication and precompaction techniques. Larger filter element thicknesses appear to add little if any to filtration effectiveness while substantially increasing weight and volume of the filter and creating larger pressure drops during filtration.

Flow rates for the present filter assembly are generally lower than for rapid sand filters when measured on the basis of gallons per minute per square foot of surface area. However, the flow rate for the present filter assembly is significantly greater than that for even rapid sand filters when measured in gallons per minute per unit of filter volume.

The volume of backwash fluid employed in the present filter may be varied so as to use only that quantity necessary to remove filtered solids from the filter elements, thereby allowing the recovery of such solids in a highly concentrated form with minimum loss of effluent. By contrast, conventional sand filters have a fixed requirement for backwash fluid providing a sufficiently high velocity to fluidize the entire sand bed, normally increasing its volume by as much as 50% during backwash.

SUMMARY OF THE INVENTION

In summary, the present filter construction as described in the preferred manner below is most similar to known sand and diatomaceous earth filters in being suited for handling large volume of fluids with relatively low solids concentrations, for example up to approximately 500 ppm and preferably a maximum of 100–200 ppm.

Filter press type systems, on the other hand, are particularly suited for handling lower fluid volume with higher solids concentrations of 1,000 ppm or more for example.

The present filter may also be used to filter higher solids concentrations with the same improved result noted above. However, the preferred embodiment of the present filter is made as compact as possible with limited space being provided between the filter elements. Thus, in applications with rapid filter cake buildup, excessive amounts of fluid and time would be required for backwashing. The present filter could of course be designed with layer spaces between the filter elements to adapt it for such applications; however, this would involve a sacrifice in compactness which is emphasized in the preferred filter embodiment described below.

Compactness of the present filter in comparison with prior art sand filters is emphasized in the following table wherein "packing density" is defined as the quantity of filtering surface area which can be arranged in a unit volume. The tabular information demonstrates that, despite a lower flow rate per unit of filter area, the present filter is much more compact than conventional sand filters.

| | BOHNA FILTER SYSTEM | RAPID SAND FILTER | SLOW SAND FILTER |
|---|---|---|---|
| PACKING DENSITY, sq.ft./cu.ft. | 8.1 | 0.17 | 0.17 |
| FLOW RATE gpm/sq.ft. | 0.25–1.0 | 2–4 | 0.05 |
| FLOW RATE gpm/cu.ft. | 2.0–8.0 | 0.3–0.7 | 0.01 |

The capability of operation at low flow rates, combined with other design features described below results in filter performance which exceeds even the slow sand filter. Another feature which particularly contributes to filter performance is the compaction of the filter material which prevents "bridging" in the thin filter elements while allowing backwashing without fluidization of the filter material. Consequently, the effective pore size is considerably smaller than that of an ordinary sand filter which is repeatedly expanded or fluidized during backwash and is not believed to even approach the degree of compaction taught by the present invention.

With further reference to the above table, it is noted that the present filter may readily be constructed with a height of five feet for example. Compared with one square foot of ordinary sand filter providing one square foot of filter surface, a commercial design of the present filter having filter elements with a thickness of 0.375 inches may readily be constructed in the same floor space with as much as fifty to sixty square feet of filter area.

Accordingly, it is an object of the present invention to provide a compact filter assembly which is relatively simple to operate and which may be effectively used in a wide variety of filtering applications.

It is also an object of the present invention to provide a filter assembly wherein the filter medium is a precompacted particulate material.

It is another object of the present invention to provide such a filter assembly including supporting structure for substantially rigidly maintaining and confining precompacted filter medium in relatively thin filter elements while forming influent and effluent passages on opposite sides of each of the filter elements. Preferably, the filter elements are vertically arranged in parallel relation within a filter housing, the influent passages being in substantially free communication with an influent manifold at the bottom of the filter housing and the effluent passages being in substantially free communication with an outlet manifold at the top of the filter housing.

It is a further object to provide a filter assembly wherein the filter elements are contained between porous sheets, spacers being associated with the porous sheet material to maintain the filter material in a precompacted condition throughout the filtration and backwash operations of a filtering cycle while also maintaining the integrity of influent and effluent passages.

Still another object of the invention is to provide a novel supporting structure for securing and maintaining filter elements in parallel alignment, the supporting structure being modular in nature, thus adapting the filter assembly for mass production techniques and for the assembly of various filters having different flow rate capacities.

Other objects and advantages of the present invention are made apparent in the following description of a preferred embodiment of the invention while having reference to the accompanying drawings.

DESCRIPTION OF A PREFERRED EMBODIMENT

Figures 1, 2:
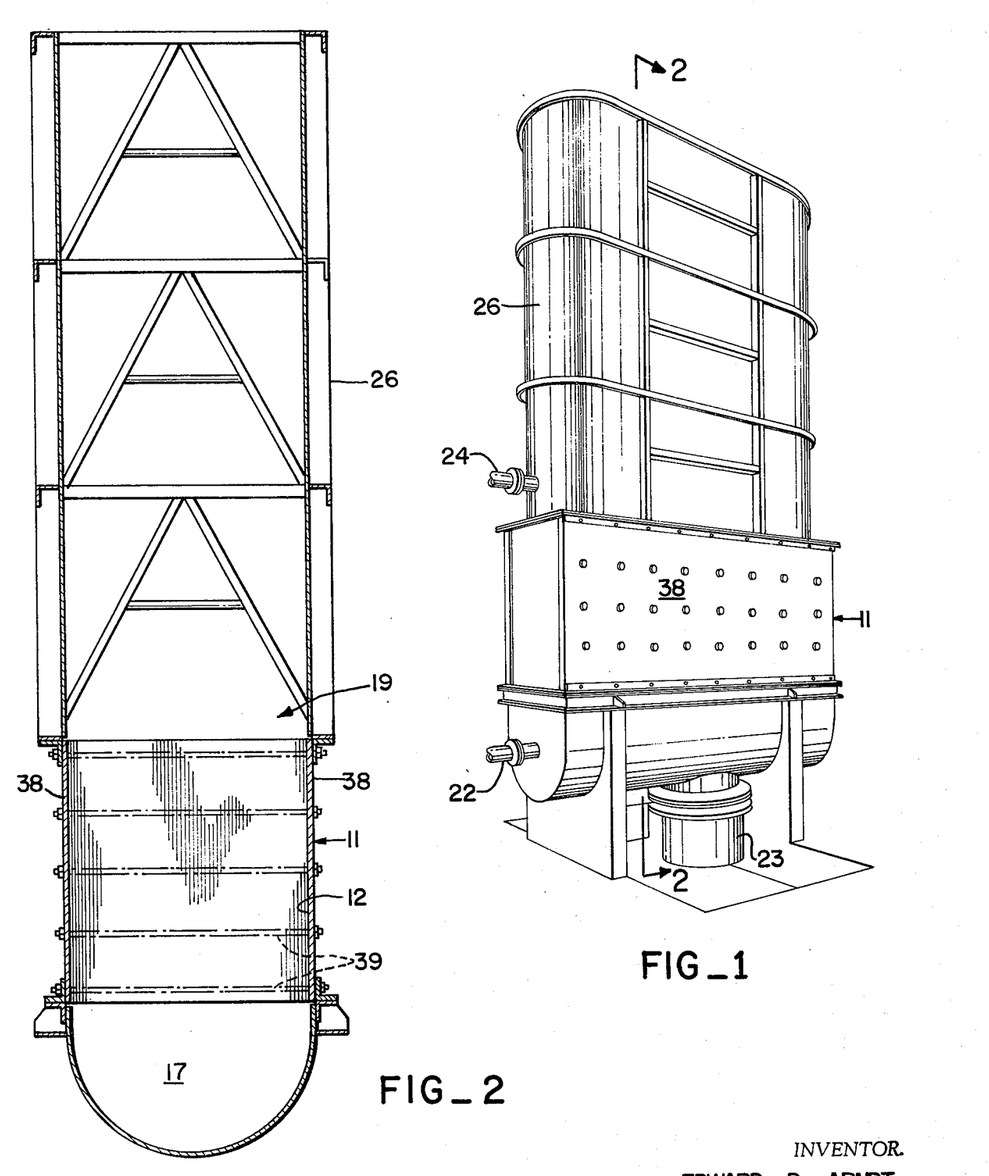
FIG. 1 is a perspective view of a filter assembly constructed according to the present invention and including a filter housing, an inlet manifold for introducing fluid to the filter housing and a backwash standpipe arranged above the filter housing, which combination readily lends itself to a particularly simple method of operation for the filter assembly of the present invention.
FIG. 2 is a vertically sectioned view taken generally at the center of the filter assembly illustrated in FIG. 1.

Referring now to the drawings, a preferred embodiment of a filter assembly constructed according to the present invention is illustrated particularly in FIGS. 1 and 2 while a preferred arrangement of filter elements within a filter housing is shown by the remaining figures.

Referring particularly to FIGS. 1 and 2, the filter assembly includes a filter unit 11 including a plurality of filter elements 13 (see FIG. 2) as discussed in greater detail below. The filter elements 13 are preferably arranged in vertically spaced apart relation within the filter unit 11 and are supported therein in a manner also described below to form influent passages 14 and effluent passages 16 respectively on opposite sides of each filter element 13.

An influent manifold 17 is provided at the base of the filter unit 11 in substantially free communication with each of the influent passages 14 by means of respective openings 18 extending substantially across one dimension of the filter unit 14 while being formed adjacent the bottom of the filter elements 13. An outlet manifold 19 is provided at the top of the filter unit in substantially free communication with each of the effluent passages 16 by means of openings 21 which also extend substantially across one dimension of the filter unit while being formed adjacent the tops of the filter elements 13.

An inlet conduit 22 is in communication with the influent manifold 17. A large drain conduit 23 is also in communication with the influent manifold 17 for use during backwashing of the filter elements in a manner also described in greater detail below. An outlet conduit 24 is in communication with the outlet manifold 19 for removing effluent or filtrate from the filter unit.

The filter elements may be backwashed or cleaned by various conventional methods such as by pumping, pressurized tanks, surface-washing, air-washing or a combination thereof. However, an embodiment of the present filter assembly shown in FIGS. 1 and 2 includes a backwash standpipe 26 formed as a vertical extension of the outlet manifold to permit rapid backwashing of the filter element under the influence of gravity. With such an arrangement, fluid to be filtered is delivered into the influent manifold 17 and then passes upwardly and across the filter elements to the outlet manifold 19. A portion of the fluid entering the outlet manifold is retained within the standpipe 26 to be immediately available for backwashing of the filter element.

In a preferred mode of operation, it has been found desirable to continue each filtering operation until a pressure differential of approximately 20 psi, for example, is developed across the elements 13. This differential may be measured between the influent manifold 17 and outlet manifold 19 with allowance being made for the normal fluid head across the height of the elements 13. The filter is then rapidly backwashed or cleaned to commence filtering in a new cycle.

The height of the backwash standpipe is selected according to the pressure head desired during backwash rather than the volume of filtrate required for backwashing. The volume of filtrate required to backwash the filter elements is quite small so that only a portion of the standpipe need be exhausted during backwashing in a normal filtering cycle. Once the proper head is established within the standpipe 26, additional filtrate is removed from the outlet manifold 19 through the conduit 24.

The present filter may be employed with a generally constant flow rate through the influent manifold 17 provided by a pump 25. A particularly simple control arrangement for the filter assembly of FIGS. 1 and 2 includes three valves 27, 28 and 29 (See FIG. 4) arranged respectively within the inlet conduit 22, the outlet conduit 24 and the drain conduit 23. The valve 29 across the drain conduit 23 is preferably a fast opening, large volume valve, for example a butterfly valve, to allow rapid fluid flow downwardly from the standpipe 26 through the filter unit in order to most efficiently remove filtered solids from the elements 13.

A particularly important feature of the present invention lies in selection of a particulate filter material which is precompacted within the filter elements 13 and supported or confined in that condition throughout the entire filter cycle. The use of such a filter material permits the filter elements 13 to be relatively thin so that a very large filtering surface area may be provided within the relatively small volume of the filter housing cavity 12. The manner of precompacting the filter medium within the filter elements, which is relatively critical to the present invention particularly in view of the thin cross section for the elements, is discussed in greater detail below. However, from tests conducted to date, it appears that for a particulate filter medium comprised of hard, substantially insoluble granules, the filter material should be precompacted by at least approximately 10% relative to the normal bulk density of granules.

The particulate filter material, for example, sand, preferably has a maximum effective size of approximately 0.25 millimeters while an effective size range of approximately 0.05 to 0.2 millimeters has been found to be most effective in actual testing of the present filter. Tests also appear to indicate that the preferred sand should have a uniformity coefficient in the approximate range of 1.0 to 2.0.

Also based on tests conducted to date, it further appears that configuration of the filter particles also tends to affect performance of the present filter assembly. Based on tests for at least three types of sand, it appears that the two most effective types consisted of particles having a generally angular configuration as compared to sand in which the particles were rounded or tended to appear weathered.

In the following discussion, the three types of sand are identified respectively as sand No. 1, sand No. 2, and sand No. 3. Sand No. 1 was obtained from Silver Sands Company, then having sand producing facilities at Cowell, Cal., under the classification of Silver Sand 130. Sand No. 1 was noted as having particles appearing to be angular to subangular in configuration with a chemical analysis of 90% or greater $SiO_2$.

Sand No. 2 was obtained under the classification of Amador 65 from Amador Mineral Company having mines and mills located in Ione, Cal. Chemical analysis of sand No. 2 indicated a 99.7% silica content with a hardness of 7½ to 8 on the Moh's scale. Sand No. 2 was also noted as having particles which appear angular to subangular in shape.

Sand No. 3 was obtained under the classification of Ottawa Bond from Ottawa Silica Company in Ottawa, Ill. Sand No. 3 was observed as having particles tending to be round in configuration with a bulk density and compacted density greater than for sands No. 1 and No. 2. The indicated chemical composition for Sand No. 3 is approximately 99.6% $SiO_2$. In all sands listed above, the $SiO_2$ is substantially present in the form of quartz. The following Table I outlines various important characteristics for each of these sand types.

TABLE I

|  | Effective Size (mm.) | Uniformity Coefficient | Average Bulk Density (gms/ml.) | Density Upon Compaction (gms./ml.) |
| --- | --- | --- | --- | --- |
| Sand No. 1 | 0.068 | 1.50 | 1.32 | 1.52 |
| Sand No. 2 | 0.130 | 1.45 | 1.33 | 1.49 |
| Sand No. 3 | 0.149 | 1.40 | 1.46 | 1.70 |

The various terms employed above and in Table I may be interpreted as follows:

"Effective size" is defined as that particle size which is greater than 10% of the particles in a given sample and smaller than 90% of the particles within the same sample as determined by mesh analysis. Normally, the effective size is calculated from a plot of cumulative percentages of the sample passing various screen sized. The "Uniformity Coefficient" is defined as the ratio of a sieve size passing 60% of the particles to a sieve size passing 10% of the particles from a common sample. The "Average Bulk Density" was determined from a dry, free standing sample of each sand type while the "Density upon Compaction" was determined by the average density for each sand type following precompaction in a manner similar to that employed for the filter elements 13.

With the particulate filter medium being selected according to the above criteria, it has been found that the filter elements 13 are effective when having a generally uniform thickness of no more than approximately 0.5 inches. Most of the filter assemblies constructed and tested according to the present invention have included filter elements with a thickness of approximately 0.375 inches. Data from these tests indicate that the desirable characteristics of the present filter assembly would be maintained and possibly improved by employing even thinner filter elements. This may be attributed to observations during testing that filtration occurs substantially only along the surfaces of the filter elements adjacent the influent passages. Since there is substantially very little "in-depth" filtration occurring, minimum thicknesses for the filter elements are also desirable for reducing impedance to fluid flow through the filter.

As noted above, it is believed critical within the present invention to precompact the filter medium substantially toward its maximum density. For particulate material tested within filter assemblies constructed according to the present invention, it appears that the filter material should be compacted by at least approximately 10% as compared to its normal bulk density. For the three sand types discussed above, it may be noted that each was compacted by approximately 12% or more as compared to the normal bulk density for each. Tests further indicated that it is essential to uniformly precompact the filter material across the elements 13 so that the filter material may not "bridge" or form cracks during filtration operation.

In view of the apparently critical requirement for uniformly precompacting the filter material, the present invention also contemplates novel means for supporting and substantially rigidly confining the filter elements within the filter unit 11. The invention also contemplates construction of the support and confinement means with a modular type of construction in order to facilitate mass production of the filter assemblies and readily permitting "sizing up" or "sizing down" of the fluid flow capacity for each unit. Details of the means for supporting and confining the filter elements within the filter unit are discussed below with particular reference to FIGS. 3-9.

Referring now to FIGS. 3-9, the means for supporting and confining the filter elements, while also defining the influent and effluent passages, includes a plurality of frame members 31 arranged vertically within the filter unit 11 in parallel, abutting relation with each other. Each of the frame members 31 extends substantially across one dimension of the filter unit between the influent manifold 17 and the outlet manifold 19 respectively.

Each of the frame members 31 includes a U-shaped support block 32 with risers 33 extending vertically from the cross piece 34 of the U-shaped blocks. The risers are spaced apart relative to the legs 36 of each U-shaped block and each other. As noted above, each filter element 13 has a typical thickness of 0.375 inches. Accordingly, the U-shaped support blocks and the risers for each frame member are constructed with a similar thickness. In correspondence with these typical dimensions, the risers are spaced approximately 1 foot apart from each other and from the legs 36. The support blocks 32 and the risers 33 are formed with a number of openings 37 in each for alignment with similar openings in two plates 38 placed on opposite sides of the filter unit in alignment with the frame members 31. Tie rods 39 may then be passed through each of the aligned openings to assist in supporting the relatively heavy filter element within the filter unit and to contribute toward maintaining the precompaction condition of the sand within each filter element.

Figures 4, 5, 6:
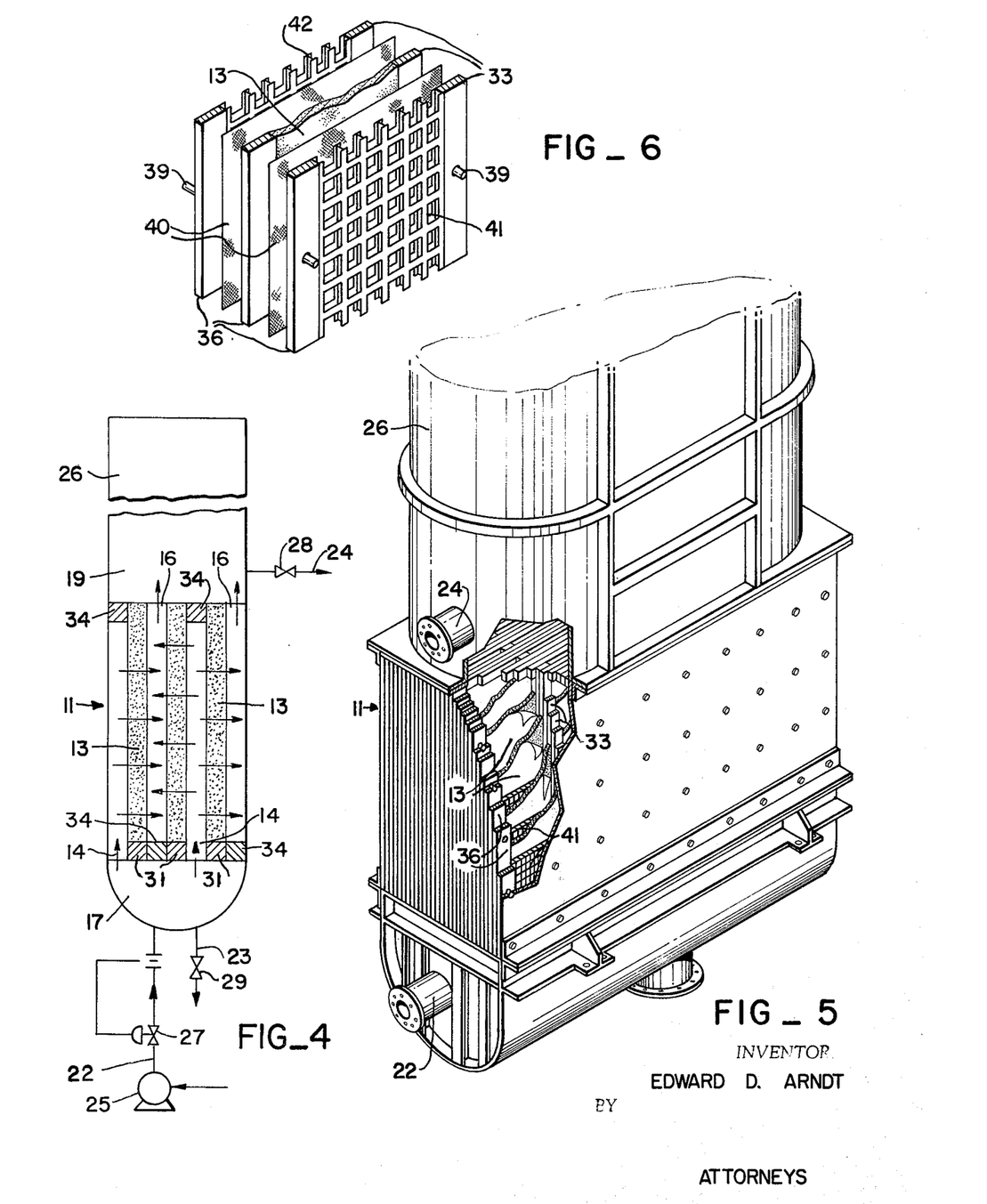
FIG. 4 is a schematic representation of the filter assembly, based generally on the view of FIG. 2, to more clearly illustrate the modular type of construction within the filter and the path of fluid flow therethrough.
FIG. 5 is a perspective view of the filter housing, with parts broken away to assist in showing the arrangement of the filter elements within the housing.
FIG. 6 is a fragmentary view including a portion of one of the filter elements and associated supporting structure within the filter housing.

As may be best seen in FIG. 5, the plates 38 and the legs 36 of the U-shaped blocks form the sides of a housing for the filter unit 11. The filter unit is then connected to the influent manifold housing and the standpipe 26 by means of flanges (See also FIGS. 1 and 2) with gasket material (not shown) being provided to prevent leakage. The plates 38 thus provide longitudinal or vertical support for the filter elements 13. As filter capacity is increased by the use of more filter elements, additional similar vertical support may be required across the filter unit. However, it is immediately apparent that this manner of construction reduces the weight and cost of the filter assembly since the frame members 31 together with the two simple plates 38 integrally form a housing for the filter unit 11.

The U-shaped support blocks 32 for alternate frame members 31a open upwardly so that each may be readily filled with filter material. The other U-shaped support blocks 31b and 31c respectively form the influent and effluent passages. These support blocks open downwardly and upwardly respectively to form the openings 18 and 19.

Sheets 40 of porous material, for example, polyethylene monofilament woven cloth having pores or openings which are approximately 750 microns by 18 microns, are secured to each side of the alternate frame members 31a for containing the filter material. Different materials could be used for the porous sheets 40. However, they should have generally uniform openings to confine substantially all of the precompacted material. Additionally, the sheets should have sufficient openings so as not to significantly affect fluid flow through the elements and adequate strength for restraining the precompacted material.

After the filter material is uniformly compacted throughout each of the filter elements 13, the tops of the alternate frame members are closed for example by extending one of the porous sheets upwardly and sealing it across the opening at the top of the support block.

Figures 3, 8, 9:
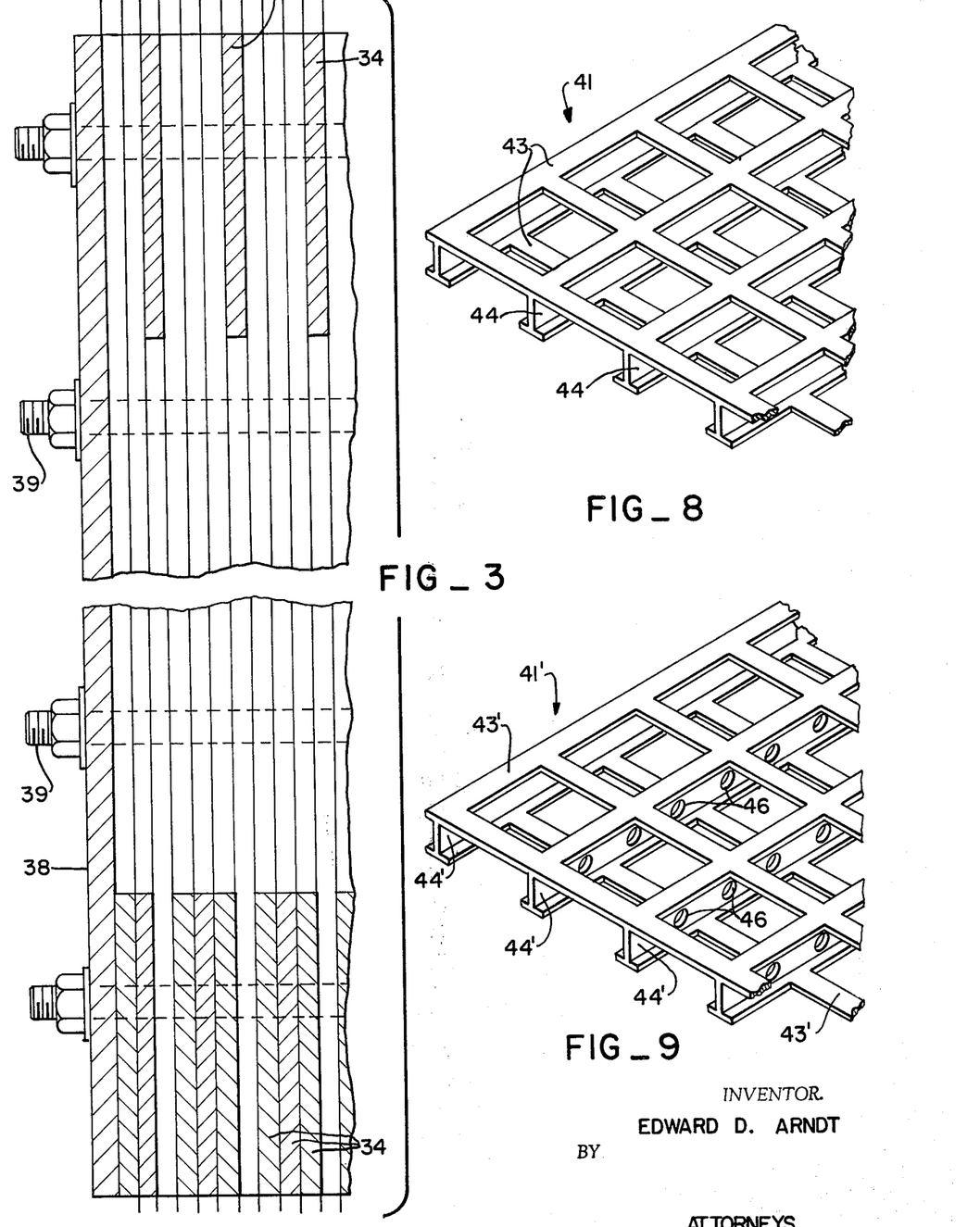
FIG. 3 is an enlarged fragmentary view similar to FIG. 2 while being substantially limited to the arrangement of filter elements within the housing, FIGS. 2 and 3 serving to illustrate the flow path for fluid passing through the filter assembly.
FIG. 8 is a fragmentary view of a preferred spacing means for maintaining confinement of particulate material within the filter elements while maintaining integrity of the influent and effluent channels on either side of each filter element.
FIG. 9 is a similar view of another embodiment of the spacer means shown in FIG. 8.
Figure 7:
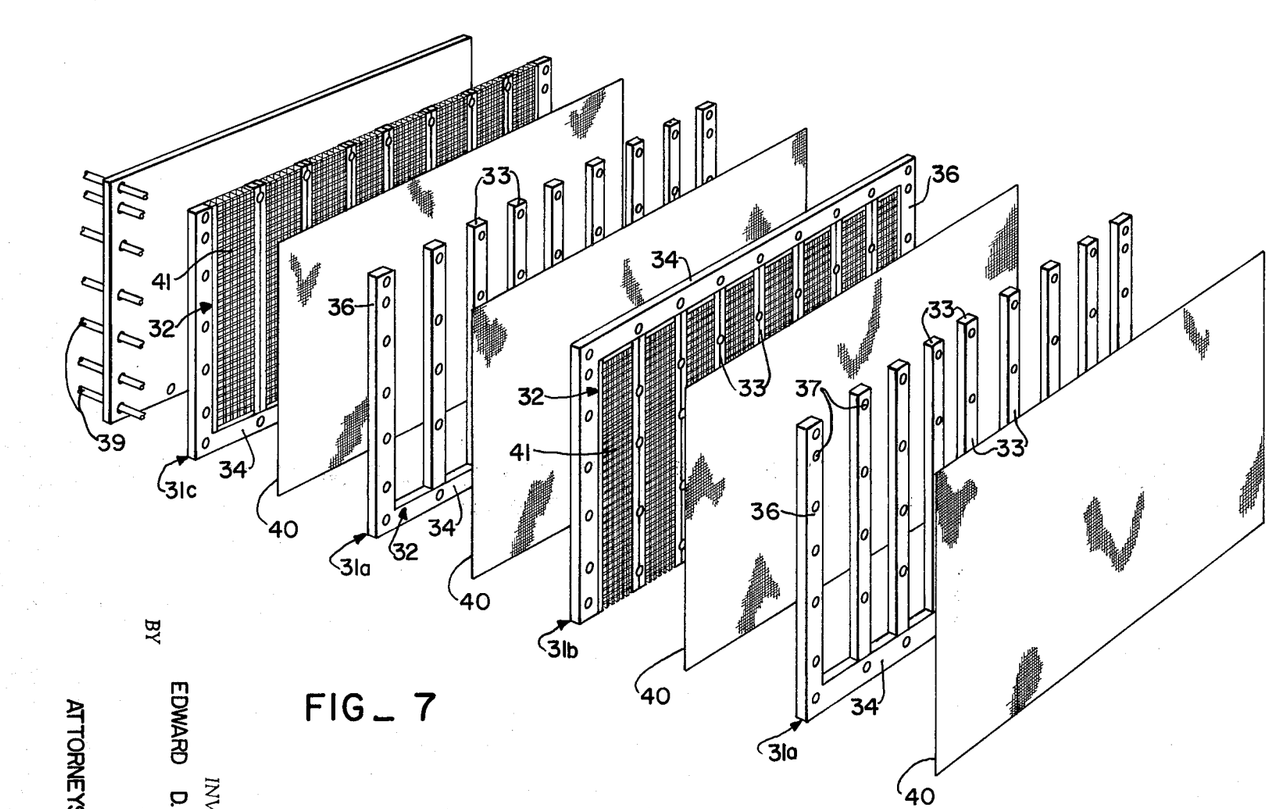
FIG. 7 is an exploded perspective view of portions from two different filter elements and associated supporting structure within the filter housing.

In order to maintain proper precompaction uniformly across each of the filter elements, spacing structures 41 are associated with adjacent pairs of the porous sheets 40. As best seen in FIGS. 6–8, the spacers 41 are supported by the other frame members 31b for arrangement within each of the influent passages 14 and effluent passages 16 between the filter elements 13. Accordingly, each of the spacers 41 tends to act in compression upon precompacted sand within each of the filter elements by means of the porous sheets 40.

Because of the substantial precompaction of the filter material, the porous sheets tend to bulge outwardly so that substantial lateral support must be provided by the spacers. It has been found that preferably no more than approximately 1 square inch of the porous sheet material should be left without lateral support. However, suitable support may be provided by assuring that each exposed section of sheet material has one dimension of less than approximately one inch. Additionally, since the spacers are arranged within the influent and effluent passages, they must further function to permit substantially free fluid flow through the influent passages, across the filter element and out through the effluent passages. Accordingly, the spacers 41 (See FIG. 7 for detail) are arranged within each of the open areas formed by the U-shaped support blocks and the risers 33. Each spacer 41 includes a pair of flat, open grids 43 with ribs 44 being arranged between the grids. The ribs maintain the grids in abutting relation with the associated porous sheets in order to establish appropriate spacing within the filter elements 13 while permitting substantially unimpeded fluid flow. As shown in FIG. 7, the ribs are substantially solid so that a separate vertical channel is formed between each adjacent pair of ribs.

In order to allow more uniform fluid flow within the influent and effluent passages, an alternate spacer element 41' as shown in FIG. 8 includes similar grids 43' and 44' with the ribs having spaced perforations 46 to allow cross flow of fluid between the channels formed by the ribs. In order to provide lateral support around each square inch of the porous sheet as discussed above, the grids 43 or 43' are preferably formed with one inch square openings. Furthermore, referring to both FIGS. 7 and 8, it may be seen that portions of adjacent grids are preferably offset with respect to each other. This arrangement tends to prevent "blinding" of the sand between aligned grid portions on opposite sides of each filter element and thus contributes to more uniform fluid flow through the filter elements 13.

Preferably, all fluid contacting portions of the frame members 31 are constructed of plastic or other noncorrosive material to minimize the accumulation of rust or other corrosion products on the filter elements 13.

As noted above, it is important to uniformly precompact the filter material within each of the filter elements 13. A preferred method of precompaction is to first assemble the frame members or assemblies 31 into the filter unit 11. The filter material such as sand is then added to each element 13 in increments with each increment being thoroughly vibrated or rodded, for example, to achieve substantially maximum compaction. This procedure is continued until each of the elements is completely filled after which they are closed in the manner described above. Care must be taken during this procedure to insure that each increment of sand is uniformly compacted within each element to avoid "opening" or "bridging" of the filter material during operation.

The arrangement of the filter elements 13 and the path of fluid flow through a filter constructed according to the present invention may be best seen with reference to FIG. 4. As seen therein, the filter elements are vertically aligned in the filter unit 11 to form the influent and effluent passages 14 and 16 on opposite sides of each element 13.

With the valve 29 closed and the valves 27 and 28 open during filtering, the path of fluids through the filter is illustrated by arrows. It may be seen that fluid passes upwardly from the influent manifold 17 through the influent passages 14, across the filter elements 13 and then upwardly through the effluent passages 16 to the outlet manifold 19 and backwash column 26.

When a selected maximum pressure is developed across the filter elements, for example 20 psi as noted above, backwashing is commenced by simultaneously closing valves 27, 28 and opening valve 29. Fluid flow through the filter is then reversed from that discussed above and illustrated in FIG. 4 with the backwash passing through the influent manifold 17 and the drain conduit 28.

Tests of filter units constructed according to the present invention are described below for various applications which illustrate the versatility and uniform effectiveness of the present filter.

TREATMENT OF CEMENT MANUFACTURING WASTE WATERS

A test unit constructed according to the present invention but sized down to have a nominal capacity of 0.25 gallons per minute was operated for approximately two weeks on a feed stream comprising the effluent from spray chambers of an electrostatic percipitator operated in conjunction with a group of cement kilns.

The feed contained a wide size range of particles and had a widely varying concentration of suspended solids. The range of feed concentrations was approximately 400–1000 mg./l. A portion of the feed solids settled after retention periods of 15–30 minutes, leaving a more dilute but very cloudy supernatant with a suspended solids concentration of about 150–200 mg./l.

The quality of the feed and filtrate was routinely determined by turbidity as measured by a Hach Turbidity Meter.

Tests of the present filter in this application indicated its versatility as to particle size and solids concentration in the feed. The filter consistently produced filtrates with turbidities of less than 1.0 Jackson Units. Analysis indicated suspended solids in the filtrates in a range of 1–6 mgs./l. The quality of the filtrate or effluent appeared to be independent from feed quality. That is, within the range of feed concentrations encountered, filtrate quality remained consistently excellent.

FILTRATION OF ALGAL SUSPENSIONS

A similar test unit was evaluated for use in producing clarified filtrate and/or harvesting algae from agricultural waste water ponds.

In a series of 17 typical filtration cycles, feed concentration, as determined by milligrams of suspended solids per liter of influent, varied from approximately 110 to 640 mg./l. The percentage removal of suspended solids varied from about 92.0 to 99.6% with approximately 98% or more of the suspended solids being removed in 13 of the 17 test cycles. Further, the recovery of suspended solids did not appear to be dependent on feed concentration.

For a number of these test cycles, organic nitrogen (N) content was determined in both the feed or influent as well as in the filtrate in order to calculate the percentage removal of organic nitrogen. In these tests, the percentage removal of organic nitrogen averaged approximately 93.9% as compared to the percentage removal of suspended solids which averaged 92.5% for the same tests.

It is also important to note that, although the particle size of solids or algae in the feed ranged to less than 1 micron, the above recovery rates were achieved without the use of flocculants or other chemical additives.

In this regard, observation of the backwash from these tests led to the conclusion that coagulation of even smaller particles apparently occurred on the surfaces of the filter elements, making these smaller particles available for recovery during backwash.

An important criterion of performance for a filter system in such an algae stripping operation is the concentration of suspended solids, more particularly organic nitrogen, in the backwash. Analysis in this regard was limited since the quantity of effluent introduced downwardly through the filter during backwash was not subject to close control. However, solids concentrations of up to 1.7% by weight in the backwash during the testing program led to the conclusion that, with careful control of backwash volume, concentrations in excess of 5% of suspended solids in the backwash may be achieved.

Based on these tests and assuming commercial operation, it was concluded that a 700 million gallons per day filter unit constructed according to the present invention could be profitably operated assuming sale of both the clarified effluent and algae recovered from the backwash.

FILTRATION OF MG(OH)$_2$

The pH of sea water derived from San Francisco Bay was adjusted to a value of approximately 9 to partially precipitate Mg(OH)$_2$. The water was then applied to the present filter at a rate of ¼ gal/min/ft$^2$. A similar run was made at ⅜ gal/min/ft$^2$. In each case the filtration test was run until the pressure drop across the filter reached 20 psi. The results of these tests were:

| Filtration Rate Gal/min/ft$^2$ | Suspended Solids Concentration mg/l Feed | Filtrate | Volume of water filtered before reaching 20 psi Gallons |
|---|---|---|---|
| ¼ | 106 | 21.6 | 60 |
| ⅜ | 200 | 24.1 | 62 |

What is claimed is:

1. A filter assembly comprising; a filter housing means, a plurality of flat filter elements extending substantially across one dimension of said filter housing means, said elements comprising confinement means including porous sheet material arranged along lateral surfaces of the elements to define a closed structure of substantially uniform thickness having a maximum of approximately 0.5 inches, a particulate filter medium having a maximum effective particle size of approximatey 0.25 millimeters and a uniformity coefficient in the approximate range of 1.0 to 2.0 and being precompacted by at least approximately 10% relative to its normal bulk density, said medium being disposed within and fully occupying said confinement means and being uniformly precompacted to provide for substantial filtration at the surfaces of said confined medium, spacer means including spaced means disposed adjacent to said confinement means and in contact with contiguous portions of said porous sheet material throughout the extent thereof, said spaced means coacting with said porous sheet material to continuously and rigidly confine said filter medium in order to maintain its precompacted condition during filter and backwash operations, said spacer means further maintaining adjacent filter elements in spaced apart relation within the filter housing to provide influent and effluent passages on opposite sides of each filter element, means for supporting the filter elements and the spacer elements within said filter housing means, an influent manifold for communicating the influent passages with a fluid inlet, an outlet manifold for communicating the effluent passages with a fluid outlet, said flat filter elements and the spacer means comprising a plurality of frame members arranged in contiguous parallel relationship to form at least a portion of said housing means, selected ones of said frame members comprising said filter elements and being U-shaped supports vertically arranged and having said porous sheet material disposed over the extent of each lateral side thereof and closing the open end of the U-shaped supports, said spacer means comprising other frame members interposed between said selected frame members and also comprising U-shaped supports, said spaced means comprising rigid flat, open grids, said other frame members defining one of said influent and effluent passages and being disposed in inverted U-shaped disposition with respect to the other frame members defining the other of said influent and effluent passages, said frame members including risers extending along the vertical height of the filter elements and being spaced apart relative to each other and the legs of the U-shaped supports, the spacer means being arranged in vertically extending spaces formed by the risers and the legs of the U-shaped supports in the other frame members, each spacer means comprising flat open grids respectively abutting the two adjacent porous sheets and ribs arranged between the grids to establish appropriate spacing and permit substantially unimpeded fluid flow through the influent and effluent passages, and plates arranged on opposite sides of and parallel with the frame members, the plates, the U-shaped members and the risers forming aligned openings for receiving tie rods to secure the frame members together as a structural unit and to assist in maintaining proper compaction and confinement of the filter elements during filter operations, the plates and the frame members forming at least a portion of a housing for containing the filter unit.

2. A filter assembly comprising; a filter housing means, a plurality of flat filter elements extending substantially across one dimension of said filter housing means, said elements comprising confinement means including porous sheet material arranged along lateral surfaces of the elements to define a closed structure of substantially uniform thickness having a maximum of approximately 0.5 inches, a particulate filter medium being precompacted by at least approximately 10% relative to its normal bulk density, said medium being disposed within and fully occupying said confinement means and being uniformly precompacted to provide for substantial filtration at the surfaces of said confined medium, spacer means including spaced means disposed adjacent to said confinement means and in contact with contiguous portions of said porous sheet material throughout the extent thereof, said spaced means coacting with said porous sheet material to continuously and rigidly confine said filter medium in order to maintain its precompacted condition during filter and backwash operations, said spacer means further maintaining adjacent filter elements in spaced apart relation within the filter housing to provide influent and effluent passages on opposite sides of each filter element, means for supporting the filter elements and the spacer elements within said filter housing means, an influent manifold for communicating the influent passages with a fluid inlet, an outlet manifold for communicating the effluent passages with a fluid outlet, said flat filter elements and the spacer means comprising a plurality of frame members arranged in contiguous parallel relationship to form at least a portion of said housing means, selected ones of said frame members comprising said filter elements and being U-shaped supports having said porous sheet material disposed over the extent of each lateral side thereof and closing the open end of the U-shaped supports, said spacer means comprising other frame members interposed between said selected frame members and also comprising U-shaped supports, said spaced means comprising rigid, open grids, said other frame members defining one of said influent and effluent passages and being disposed in inverted U-shaped disposition with respect to the other frame members defining the other of said influent and effluent passages, said frame members including risers extending along one dimension of the filter elements and being spaced apart relative to each other and the legs of the U-shaped supports, the spacer means being arranged in spaces formed by the risers and the legs of the U-shaped supports in the other frame members, each spacer means comprising flat open grids respectively abutting the two adjacent porous sheets and ribs arranged between the grids to establish appropriate spacing and permit substantially unimpeded fluid flow through the influent and effluent passages, and plates arranged on opposite sides of and parallel with the frame members, the plates, the U-shaped members and the risers forming aligned openings for receiving tie rods to secure the frame members together as a structural unit and to assist in maintaining proper compaction and confinement of the filter elements during filter operations, the plates and the frame members forming at least a portion of a housing for enclosing the filter unit.

* * * * *